United States Patent [19]
Durham

[11] Patent Number: 4,459,843
[45] Date of Patent: Jul. 17, 1984

[54] APPARATUS AND METHOD FOR TESTING CONTAINERS

[76] Inventor: La Moyne W. Durham, 1113 Sausalito Ct., Bartlett, Ill. 60103

[21] Appl. No.: 395,683

[22] Filed: Jul. 6, 1982

[51] Int. Cl.³ ............................................. G01M 3/26
[52] U.S. Cl. ......................................... 73/37; 73/45.1
[58] Field of Search ................ 73/37, 45.1, 45.2, 49.2; 209/591, 522, 523

[56] References Cited

U.S. PATENT DOCUMENTS 3,683,676  8/1972  Hass ..................................... 73/45.1
4,019,370  4/1977  Allocco, Jr. .......................... 73/45.1

Primary Examiner—Donald O. Woodiel
Assistant Examiner—Joseph W. Roskos
Attorney, Agent, or Firm—Barnes & Thornburg

[57] ABSTRACT

A method and apparatus for testing containers for pressure leak characteristics is disclosed. The arrangement includes monitoring the fluid pressure in a container supplied with test fluid at two different time intervals, with the monitored difference being compared with a predetermined acceptable value of container pressure loss and a signal generated to either accept or reject the tested container. To facilitate a continuous updating of the calibration of the acceptable pressure loss, a digital computer controlled arrangement is provided for adjusting the predetermined acceptable pressure loss value as a function of the monitored difference in the pressures for containers previously tested.

11 Claims, 3 Drawing Figures

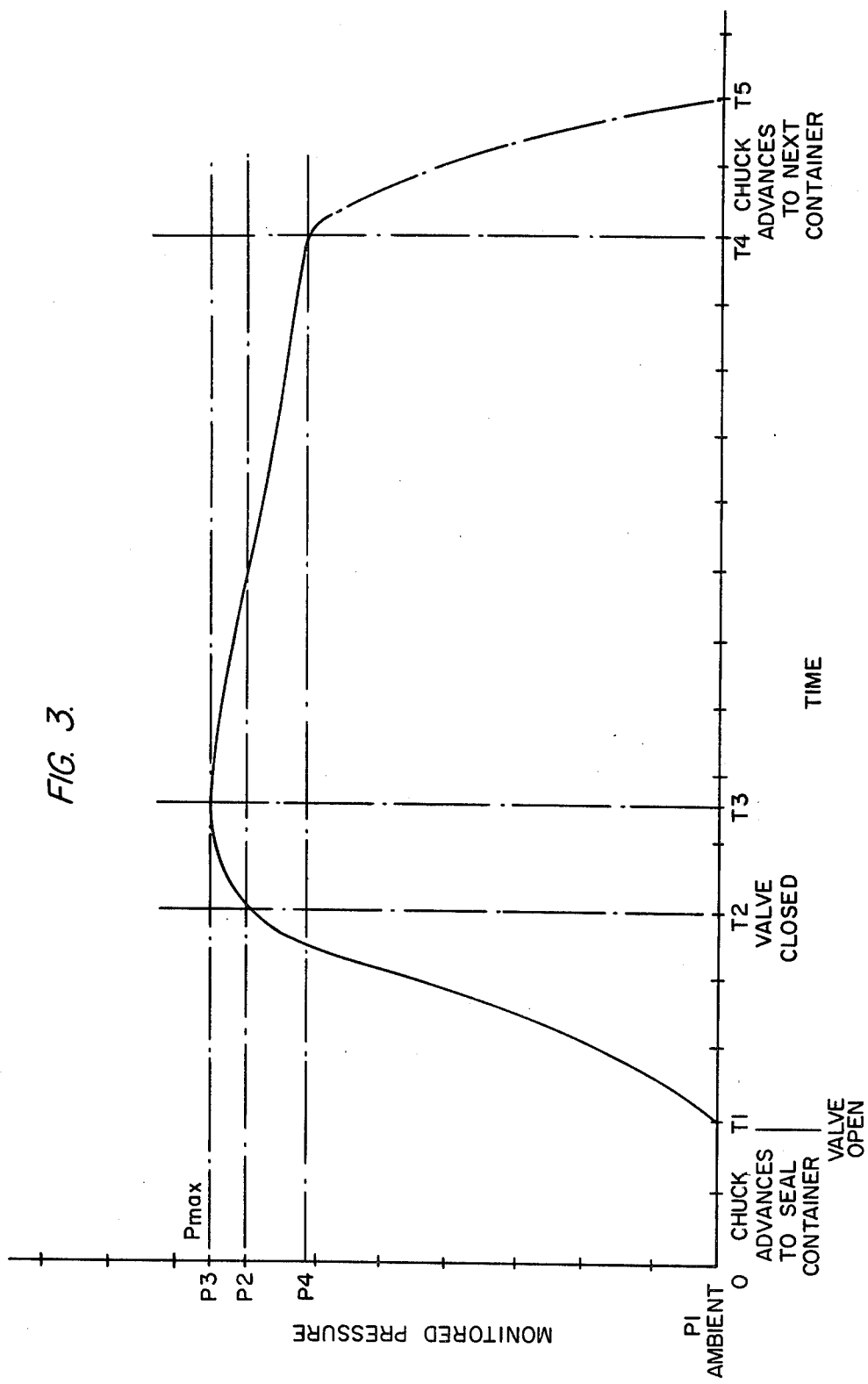

APPARATUS AND METHOD FOR TESTING CONTAINERS

BACKGROUND AND SUMMARY OF THE INVENTION

The present invention relates to apparatus and methods for testing containers. Especially preferred embodiments of the invention relate to the testing of plastic and other light material containers as they are being manufactured and prior to their being filled with any products to be shipped and/or stored therein.

There are numerous systems in use and disclosed in prior patents for testing containers. U.S. Pat. No. 4,126,034 to Conrad discloses a method and apparatus for container pressure testing which has a test chamber for housing containes as they are being leak tested by measurement of pressure changes after being pressurized. U.S. Pat. No. 4,291,573 to Richter et al. discloses a reject system for in-line pressure testing systems for containers which includes subjecting the containers to hydrostatic pressure upon failure or cracking of the containers. U.S. Pat. No. 4,019,370 to Allocco discloses a leak testing device and method for plastic bottles utilizing a constant volume reservoir which is selectively communicated with the containers, with measurement of the equilibrium pressure of the container/reservoir system which utilizes the principle of detecting leakage of fluid from a container by measuring the decay of an initial pressure input by means of a pneumatic signal amplifier arrangement.

The present invention is directed at an improved container testing arrangement which includes a combination of features making the same advantageous as compared to prior art arrangements. The arrangement of the present invention is especially advantageous in that it provides an automatic calibration arrangement. This arrangement automatically accommodates different sizes and types of containers being tested and will automatically continuously update its reference data base as to a given container size or type so that the container rejection standard is never below a predetermined percentage deviation from the best container previously tested. The arrangement of the present invention also automatically continuously maximizes the amount of time available for monitoring any pressure decay during testing of the containers by providing for the monitoring of the total cycle time available for testing of the containers (manufacturing rate) and the automatic adjustment of the pressure decay measurement time as a function of the manufacturing rate. In this way, the system automatically retains the highest possible sensitivity.

According to preferred embodiments of the invention, low pressure air is used to pressurize the containers for the testing measurements, thereby minimizing the possibility of damage due to stretching of the containers during the testing process. In particularly preferred embodiments, the pressure in the containers is monitored and analyzed in a digital form by being fed through an analog to digital converter to a microcomputer, whereby very small pressure drops can be accurately monitored and comparatively analyzed so as to minimize the magnitude of pressure required for test integrity.

Another important feature of preferred embodiments of the invention relates to the configuration of the chuck which is used to apply the test pressure in to the containers. This chuck includes an internal flared tube which separates the test air used to fill the container from the position where the container pressure monitoring tube is connected, thus avoiding any erroneous pressure readings due to pressure fluctuations in the air supply line during the test air filling phase of the testing cycle.

In preferred embodiments of the invention, the chuck for applying the test pressure air is a controllable chuck selectively sealingly engageable with the open mouth of respective containers being tested during the container test cycle. The test air for pressurizing the container is controlled by a solenoid D.C. valve located in an air line upstream of the chuck and downstream of a substantially constant pressure air reservoir source. This D.C. valve is controlled by the microcomputer in a manner described below. The chuck also contains a pressure monitoring tube with a pressure transducer. An analog-to-digital converter is provided for converting the monitored pressure to digital form to be analyzed by the microcomputer.

In operation, the testing sequence involves: movement of the chuck to sealing engagement with a container to be tested, supplying an over pressure of air to the container by way of the solenoid valve, closing the valve, monitoring the pressure decay from the maximum pressure in the container to a predetermined time period subsequent thereto, comparing this pressure decay with an acceptable pressure value generating a signal for either accepting or rejecting the container, moving the chuck away from sealing engagement with the container, and moving the container to be either rejected or further used. In the instance where a container is to be rejected, the microcomputer controls an ejection device that will remove the container from the assembly line.

In especially preferred embodiments, the microcomputer continuously monitors the time it takes to fill the containers to a predetermined reference pressure as well as the cycle time available for completing the test on respective containers. These monitored times are stored and processed by the microcomputer so that the testing sequence is timed to optimize the time available for container pressure decay monitoring.

These and further objects and features of the present invention will become more apparent from the following description when taken in connection with the accompanying drawings which show, for purposes of illustration only, one embodiment in accordance with the present invention.

BRIEF DESCRIPTION OF THE DRAWINGS

FIG. 3 is a graphical depiction of the container testing sequence for the apparatus of FIG. 1, including a plot of the pressure in the container as a function of time.

DETAILED DESCRIPTION OF THE DRAWINGS

Figure 1:
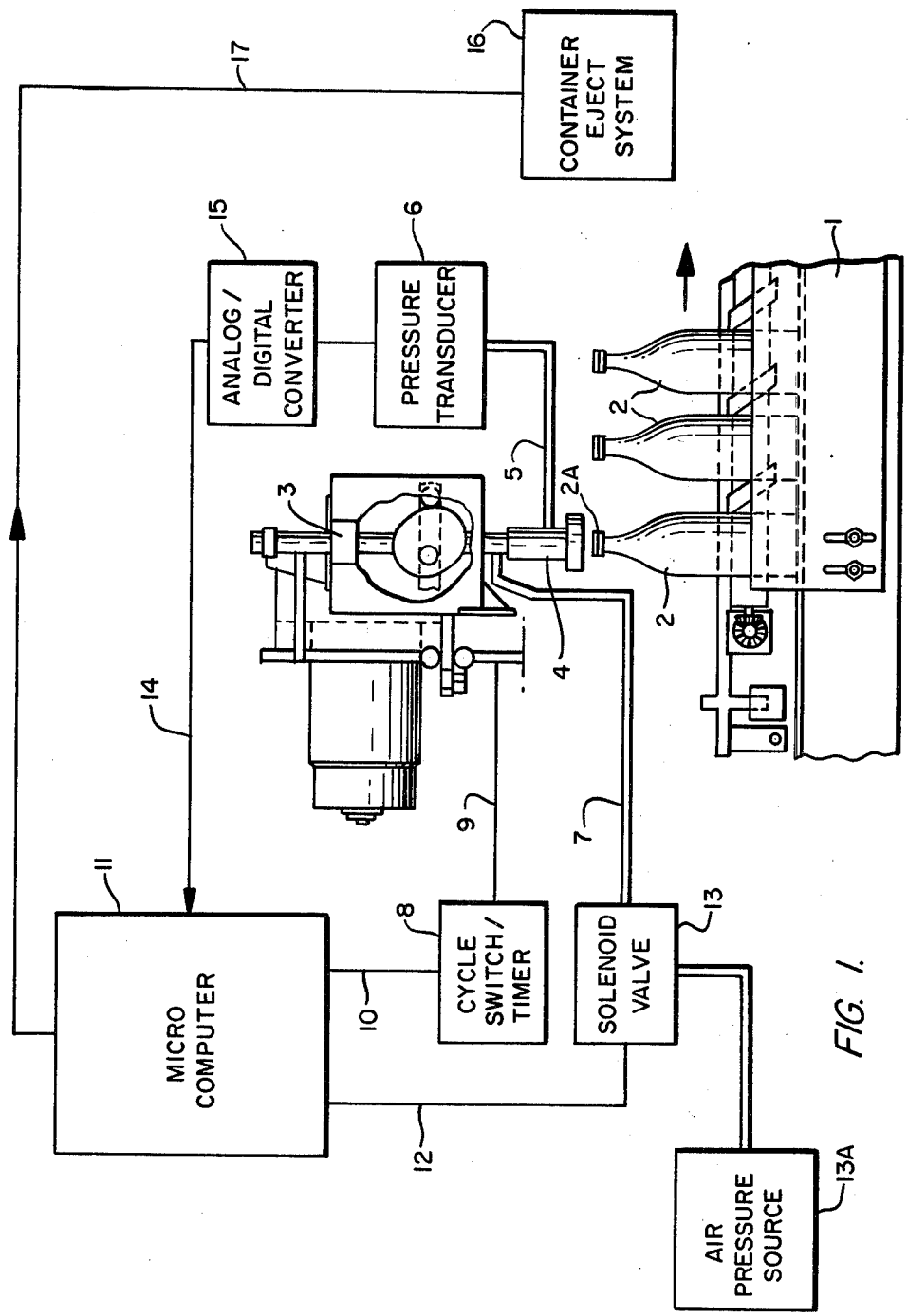
FIG. 1 is a schematic diagram depicting the container testing apparatus of the present invention.

Referring to FIG. 1, conveyor 1 carries a plurality of containers 2 which are sequentially brought into position adjacent a test station 3 which has a chuck 4 selectively and sealingly engageable with the open face 2A of the containers 2. The chuck 4, described in more detail below in conjunction with FIG. 2, includes a line connection 5 for communicating the container pressure to a pressure transducer 6. The chuck 4 also includes line 7 for communicating test air pressure to the container to pressurize the same for purposes of testing.

A cycle switch-timer 8 is connected by line 9 with the chuck control mechanism at test station 3 with line 11 schematically depicting a cycle time signal going to the microcomputer 11 as an input signal depicting the total cycle time available, based upon the monitored rate of manufacture and conveyance of the bottles 2 to and from the test station 3. Line 12 schematically depicts the electrical connection of the test air valve with the microcomputer 11, which controller controls the opening and closing of solenoid valve 13.

Line 14 communicates a digital pressure signal from the analog-digital converter 15 connected to the pressure transducer 7 such that microcomputer 11 continuously receives via line 14 the actual pressure in the container 2 being tested in digital form.

A container ejection system 16 is provided adjacent the conveyor 1 at a position downstream of the position of test station 3, and includes means of ejecting containers that are found unsatisfactory, in response to a signal via line 17 from the microcomputer 11.

Figure 2:
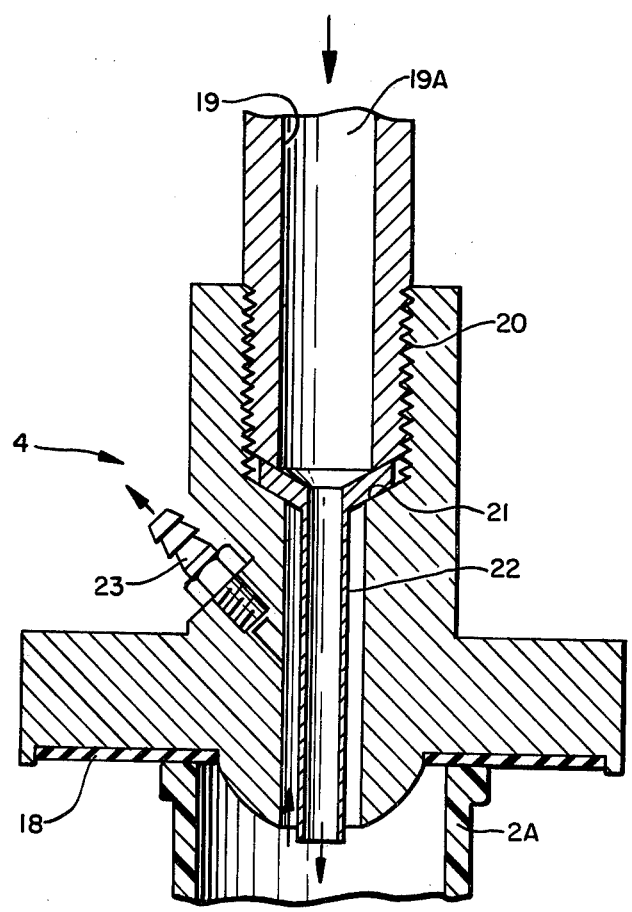
FIG. 2 is an enlarged schematic sectional view showing details of the test air supply nozzle and pressure monitoring line used with the FIG. 1 apparatus.

FIG. 2 shows chuck 4 in enlarged form, depicting the same in sealing engagement with open face 2A of a container 2. The chuck 4 includes a sealing surface with a resilient seal 18 made of rubber or the like to sealingly engage against the upper part of mouth 2A of the container. Since the chuck 4 is firmly held by the chuck assembly against the container mouth 2A during the test cycle, escape of air through the mouth of a container during testing is prevented.

Chuck 4 is threadingly engaged at 20 to the hollow cylinder rod 19 having an opening 19A. Below the cylinder rod 19 and in clamping relationship between the cylinder rod 19 and a shoulder 21 of chuck 4 is a flanged tubular insert 22 which serves to separate the flow of air into the container via opening 19A from a pressure sampling nipple 23. This arrangement permits the pressure in the container to be accurately represented in the opening of nipple 23 without influence of the separate fill source 22. Nipple 23 is connected to line 5 leading to the pressure transducer 6 as shown in FIG. 1. The opening 19A is communicated directly with the line 7 leading from the air pressure source 13A controlled by the solenoid valve 13.

In preferred embodiments of the invention for use with small containers (under one gallon in size), the solenoid valve 13 is constructed as a single D.C. controlled valve unit, which has very rapid response times so as to accurately control the supply of test air pressure to the container during testing. The test air pressure, as compared to ambient atmospheric air pressure, is quite low so as to prevent damage to the containers being tested and also provide for a fast filling time and a longer test time. In instances where containers of more than a gallon in size are used, a more than one D.C. solenoid valve are preferably used so as to maintain a short filling time. The number and type of valves may be varied to achieve the desired result of low test time and accuracy. Note that preferred range of test air pressure equivalent to about 2 inches of water pressure are contemplated by the present invention in testing stretchable light containers. The apparatus is adaptable to test all containers of varying size and construction.

The operation of the apparatus and the container testing method is as follows. FIG. 3 depicts the pressure monitored in line 5, the container pressure, as a function of the lapsed time for a complete container testing cycle. At time $T=0$, the container to be tested is either in position adjacent the chuck 4 or on its way to that position so as to arrive and be engageable with its mouth 2A with the chuck 4 at least by time T1 when the chuck is moved into sealing position. The microcomputer 11 sends a first signal to the chuck 4 to move the chuck 4 into position against the container mouth 2A. Subsequently at predetermined time T1 corresponding to the time it takes for the chuck 4 to move into sealing position, the microcomputer activates valves 13 to open the same and supply the container 2 with increased air pressure from the air pressure source 13A. The microcomputer 11 monitors the pressure in the container and automatically closes the valve 13 at a time T2 when the sensed pressure is a predetermined pressure P2. Pressure P2 is a reference test pressure which is determined during the initial calibration of the system, as described more fully below. Some short time subsequent to the closing of valve 13, at a time T3 the microcomputer 11 senses the maximum pressure P3 reached during the test cycle, which value is stored in the computer. At a time T4, which is a predetermined time after T3, the computer measures and stores the container pressure P4 then existent. The difference between P3 and P4 equals the pressure loss or decay experienced by the container. The measured pressure loss P3-P4 is then compared by the computer 11 against an acceptability standard obtained during calibration proceedings, and a decision either to reject or accept the container is made. If to be rejected, a signal is sent via line 17 to the container ejection system 16 to eject the particular container 2 when it gets to that position.

At time T4 when the pressure reading is made, the microcomputer 11 sends a signal to the test station 3 to remove the chuck 4 from the container being tested and the next container will move into position adjacent chuck 4. At time T5, the next container will be at a position to be sealingly engaged with chuck 4 and the cycle will start over with time T5 being equivalent to time T1.

The microcomputer 11 is initially calibrated so as to have a predetermined maximum fill time period T2-T1 that is acceptable for testing purposes. In the event there is a major leak in the container, the fill time may be so long that there is no time left in the total cycle time T5-T1 to conduct any meaningful test. That is, the time T4-T3 will be either nonexistent or too short to meaningfully test the pressure decay P3-P4. The computer will continuously re-establish the optimum fill time T2-T1 by setting a new standard, which is a predetermined time period longer than the shortest previously experienced fill time period. In this way, the standard of acceptability for the filling time parameter will be continuously updated and compared with the best prior container tested. With such an arrangement, even if the initial automatic calibration was done on a defective container, the system automatically corrects itself when a good container is tested.

The controller also continuously upgrades the calibration on the acceptable limits of pressure decay P3-P4 by reestablishing the acceptance criteria based upon the best previous container tested. For example, the system may be initially programmed to accept only those containers with a pressure decay within 10% of the best previously experienced decay figures. This recalibration of the acceptable pressure range also self corrects against initial calibrations on defective containers and upgrades the acceptability standards to be within a certain deviation range from the best container previously tested.

The total test time T5-T1 available is a time which is dependent upon the rate of manufacture of the containers being supplied to the testing apparatus. Test time T5-T1 is fixed for each manufacturing sequence. Since the times for moving the chuck to and from the container testing position (times T1 and T5-T4) are also constant, the above-mentioned feature of the computer to update the optimum fill time T2-T1 also inherently enhances the sensitivity of the tests by maximizing the time T4-T3 actually used for measuring the pressure decay P3-P4.

The system is designed so as to be automatically initially calibrated by using the initial test container of a particular manufacturing run. The first container is used to establish a base for an initial fill time T2-T1. This is done by storing in the microcomputer 11 a reference pressure corresponding to the ambient pressure in the test area plus a predetermined pressure gradient. This reference pressure is used as the base value for all the other readings so that the system is independent of any drift due to temperature changes or component aging since changes in the ambient pressure will automatically adjust this reference pressure. When the chuck 4 is in position on the test container, the computer controls the opening of valve 13 until such time as this reference pressure is reached when it is closed. After waiting approximately 0.2 seconds, the pressure is again sampled to determine how close the actual pressure in the container is to this reference pressure. If the reading is within acceptable limits, it being noted that this pressure in the container will almost always be larger than the pressure measured at the time the signal to close the valve is given due to mechanical time constant delays in shutting off the valve and due to the digital filter in the analog-to-digital converter, this initial reference pressure will be locked in as the P2 pressure for closing the valve. However, in those instances with smaller containers, the overshoot of actual pressure may be outside of acceptable limits and then a new lower P2 pressure will have to be established. That is, the system automatically compensates for different size containers being tested during this initial calibration procedure.

With this system, it does not make much difference what the test pressure is as long as it is fairly consistent. In practice, the desired test pressure is approximately equal to 2 inches of water column pressure or less for extremely light walled plastic containers, which will prevent distortion or damage due to excessive test air pressure. Such a low test air pressure also means a decrease in the time it takes to fill a bottle leaving more time to actually test the bottle for leaks. In preferred embodiments, a lightweight gallon bottle can be filled in approximately 0.2 of a second.

The initial test container is also used to establish a baseline for the other test parameters. When the sign is received by the microcomputer indicating that the test container is in position, the computer does the following:

(1) First the chuck 4 brought into contact with the container and the valve 13 is opened until the adjusted test pressure P2 (determined as described above) is reached when the valve is closed. The computer then stores the time T2-T1 as the "base fill time" against which the later containers being tested are compared, as described above.

The microcomputer then samples the pressure transducer 6 continuously to determine the maximum pressure P3, which occurs when the pressure remains constant or begins to fall, at which time this maximum pressure is stored in the computer. The computer continuously monitors the cycle switch 8 to determine how long it has to test the container, which is the time T5-T1 which is the total time controlled by the manufacturing system. When the cycle switch signal indicates to stop testing, a time value is established called the "test time" (time T4-T1). This calibration procedures allows the system to use the maximum time available to test the bottle automatically and thereby automatically adjust the sensitivity of the system.

In summary, the calibration steps on the test container automatically determines how much air is needed to fill the container, how long it takes to read the test pressure, how long the container can be sampled, and the allowable pressure drop in the container to be considered acceptable.

After this initial calibration, the system automatically tests and updates its own calibration in the manner described above, assuring optimum utilization of the time available for testing and also optimization of the quality of the containers being accepted.

Because of the self-correction to the calibration, no adjustments are needed or possible by the operator of the system and the system will automatically maximize its own sensitivity based on sample time and size of the container.

With the system, every parameter used in testing a container is preferably displayed on a digital readout and a record can be maintained for quality control evaluation purposes which indicates the number of good containers and the number of rejections. In preferred embodiments, the source of air pressure for testing has a fixed pressure regulator which would neither require nor permit manual adjustments during testing.

While I have shown and described a single preferred embodiment in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Apparatus for testing containers comprising:
   test fluid supply means for supplying test fluid to a container to be tested,
   pressure monitoring means for monitoring the difference between a first pressure in a container being tested after the initiation of the supply of test fluid by the supply means and a second pressure in the container at a time subsequent to monitoring of the first pressure,
   control means responsive to the monitored difference in the first and second pressures for rejecting containers when said difference is greater than a predetermined acceptable pressure loss value,
   wherein said control means includes means for automatically adjusting the predetermined acceptable pressure loss value as a function of the monitored difference in the first and second pressures for containers previously tested.

2. Apparatus according to claim 1, wherein the test fluid supply means includes means for supplying pressurized air to a container to be tested, and wherein the first and second pressures are monitored subsequent to the supply of the pressurized air and while the opening of the container is sealed against loss of pressure.

3. Apparatus according to claim 2, wherein the control means includes a microcomputer, and wherein an analog-to-digital converter is provided between the pressure monitoring means and said computer for converting the monitored pressure to digital form for processing by the microcomputer.

4. Apparatus according to claim 2, wherein container conveying means are provided for sequentially conveying containers to be tested to and from testing positions where said air pressure supply and said pressure monitoring occurs, with said containers being available in said testing position for a limited testing time period, wherein said air pressure supply means includes a solenoid controllable valve in an air pressure line.

5. Apparatus according to claim 1, further comprising chuck means engageable with a container to be tested; said chuck means including a first opening connected to said fluid supply means and a second opening connected to said pressure monitoring means.

6. Apparatus according to claim 5, wherein said first and second openings are separate whereby pressure monitored at said second opening is not directly effected by pressure variations within said fluid supply means.

7. Method for testing containers comprising:
supplying test fluid to a container to be tested,
monitoring the difference between a first pressure in a container being tested after said supplying said test fluid has been initiated and a second pressure in the container at a time subsequent to monitoring of the first pressure,
rejecting containers being tested in response to monitored differences in said first and second pressure which exceed a predetermined accetable pressure loss value,
and automatically adjusting the predetermined acceptable pressure loss value as a function of the monitored difference in the first and second pressure for containers previously tested.

8. Method according to claim 7, wherein the supplying test fluid includes supplying pressurized air to a container to be tested, and wherein the first and second pressures are monitored subsequent to the supply of the pressurized air and while the opening of the container is sealed against loss of pressure.

9. Method according to claim 8, further comprising sequentially conveying contaners to be tested to and from testing positions with said containers being available in said testing position for a limited testing time period, wherein said supplying of pressurized air includes controlling the flow of air with a solenoid controllable valve in an air pressure line.

10. Method according to claim 7, further comprising chucking containers to be tested;
said chucking including connecting a first opening to a fluid supply means and connecting a second opening to a pressure monitoring means.

11. Method according to claim 10, wherein said first and second openings are separate whereby pressure monitored at said second opening is not directly affected by pressure variations within said fluid supply means.

* * * * *